(12) United States Patent
Panza et al.

(10) Patent No.: US 10,696,561 B2
(45) Date of Patent: Jun. 30, 2020

(54) METHOD FOR INCREASING THE CAPACITY OF AN AMMONIA PLANT

(71) Applicant: Casale SA, Lugano (CH)

(72) Inventors: Sergio Panza, Como (IT); Luca Pasco, Lozza (IT)

(73) Assignee: Casale SA, Lugano (CH)

( * ) Notice: Subject to any disclaimer, the term of this patent is extended or adjusted under 35 U.S.C. 154(b) by 86 days.

(21) Appl. No.: 15/576,068

(22) PCT Filed: May 4, 2016

(86) PCT No.: PCT/EP2016/059967
§ 371 (c)(1),
(2) Date: Nov. 21, 2017

(87) PCT Pub. No.: WO2016/184683
PCT Pub. Date: Nov. 24, 2016

(65) Prior Publication Data
US 2018/0141823 A1  May 24, 2018

(30) Foreign Application Priority Data

May 21, 2015 (EP) .................................... 15168757

(51) Int. Cl.
*C01C 1/04* (2006.01)
*B01D 3/38* (2006.01)
*C01B 3/02* (2006.01)

(52) U.S. Cl.
CPC ................ *C01C 1/047* (2013.01); *B01D 3/38* (2013.01); *C01B 3/025* (2013.01); *C01C 1/0447* (2013.01);
(Continued)

(58) Field of Classification Search
CPC ......... C01C 1/047; C01C 1/0447; B01D 3/38; C01B 3/025; C01B 2203/068; C01B 2203/0205; C01B 2203/0475; Y02P 20/52
See application file for complete search history.

(56) References Cited

U.S. PATENT DOCUMENTS 4,409,191 A * 10/1983 Osman ............... B01D 53/1462
423/220
4,464,228 A * 8/1984 Roensch ................ B01D 3/343
203/49

(Continued)

FOREIGN PATENT DOCUMENTS

EP   0 294 564 A1   12/1988
EP   2 022 754 A1    2/2009

(Continued)

OTHER PUBLICATIONS

International Search Report dated Jul. 20, 2016 in connection with PCT/EP2016/059967.

(Continued)

*Primary Examiner* — Anthony J Zimmer
(74) *Attorney, Agent, or Firm* — Akerman LLP

(57) ABSTRACT

A method for treatment of process condensate (1) in an ammonia plant, wherein the ammonia plant comprises a front-end section producing a make-up gas and a synthesis section where the make-up gas is reacted to ammonia, and said process condensate (1) is collected from one or more equipment of the ammonia plant and is an aqueous solution comprising ammonia, carbon dioxide and methanol. Said method comprises: stripping said process condensate with low-pressure steam (4), obtaining a vapour phase (5) comprising ammonia, carbon dioxide and methanol stripped from the process condensate; condensing said vapour phase, obtaining a solution (11) enriched of ammonia and methanol; re-introducing a first portion (12) of said solution to said (Continued)

stripping environment; recycling a second portion (13) of said solution to said ammonia plant.

9 Claims, 1 Drawing Sheet

(52) U.S. Cl.
CPC ............ *C01B 2203/0205* (2013.01); *C01B 2203/0475* (2013.01); *C01B 2203/068* (2013.01); *Y02P 20/52* (2015.11)

(56) References Cited

U.S. PATENT DOCUMENTS

| | | | |
|---|---|---|---|
| 5,223,238 A * | 6/1993 | Czuppon | C01B 3/025 423/359 |
| 5,385,646 A * | 1/1995 | Holiday | B01D 3/38 203/11 |
| 5,498,404 A * | 3/1996 | Hansen | B01J 23/755 423/654 |
| 5,643,420 A * | 7/1997 | Holiday | B01D 3/38 203/11 |
| 5,779,861 A * | 7/1998 | Holiday | B01D 3/38 203/11 |
| 10,040,691 B2 | 8/2018 | Ostuni et al. | |
| 2007/0044659 A1 * | 3/2007 | Neylon | B01D 3/38 95/264 |
| 2009/0239959 A1 * | 9/2009 | Wallace | C01B 3/12 518/700 |
| 2011/0206594 A1 | 8/2011 | Singh et al. | |
| 2012/0207663 A1 | 8/2012 | Iob | |
| 2014/0117287 A1 * | 5/2014 | Ariyapadi | B01J 7/00 252/373 |

FOREIGN PATENT DOCUMENTS

| | | |
|---|---|---|
| EP | 2 065 337 A1 | 6/2009 |
| RU | 2174942 C2 | 10/2001 |
| RU | 2193023 C2 | 11/2002 |

OTHER PUBLICATIONS

International Preliminary Report on Patentability dated Aug. 25, 2017 in connection with PCT/EP2016/059967.
Response to Written Opinion filed on May 2, 2017 in connection with PCT/EP2016/059967.
Krishnaswamy et al., "Process Condensate Stripper Performance in Ammonia Plants", Nitrogen + Synthesis, vol. 315, Feb. 2012, pp. 50-54.

* cited by examiner

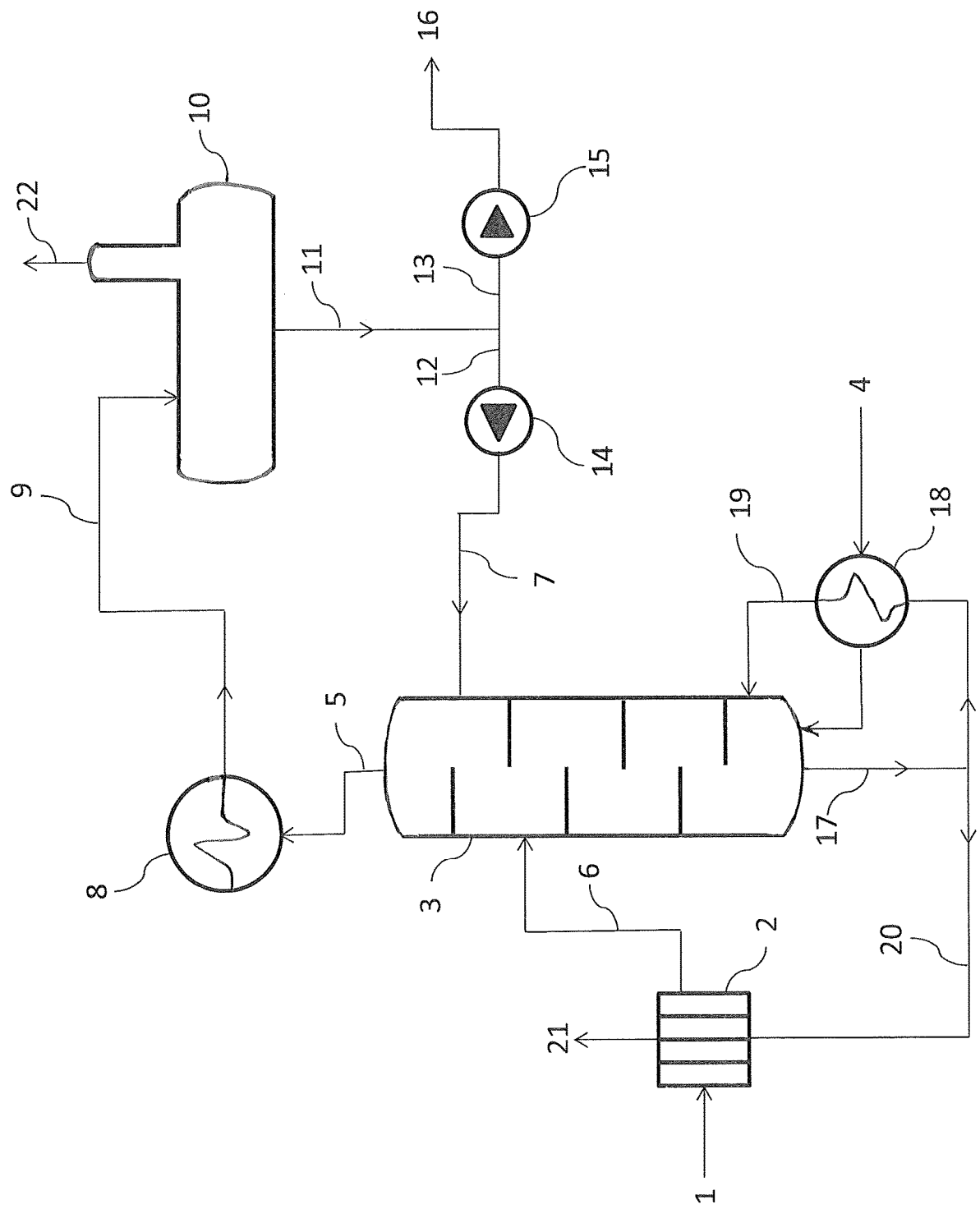

METHOD FOR INCREASING THE CAPACITY OF AN AMMONIA PLANT

This application is a national phase of PCT/EP2016/059967, filed May 4, 2016, and claims priority to EP 15168757.1, filed May 21, 2015, the entire contents of both of which are hereby incorporated by reference.

FIELD OF THE INVENTION

The invention relates to the treatment of process condensate in a plant for the synthesis of ammonia.

PRIOR ART

Ammonia is prepared starting from a make-up gas comprising hydrogen ($H_2$) and nitrogen ($N_2$). Said make-up gas is conventionally produced by reforming a hydrocarbon, such as natural gas, in a front-end section. The front end section includes a purification section, a reforming section and a syngas preparation section. The purification section includes for example a desulphurization converter, the reforming section may include a primary reformer and a secondary reformer and the syngas preparation section generally comprises one or more shift converters, a carbon dioxide removal section and a methanator.

A front end for the production of the ammonia make-up gas is described for example in EP 2 022 754 and EP 2 065 337.

The term "process condensate" denotes one or more by-product streams of contaminated water collected from different locations of the plant. Said process condensate streams typically contain small (less than 1%) but not negligible amounts of ammonia, carbon dioxide, methanol and other contaminants. Most of the process condensate typically originates from the reforming section and the syngas preparation section of the front-end, namely from a separator before the carbon dioxide removal section.

Due to the above contaminants, the process condensate cannot be discharged as such. A prior art technique of treating the process condensate is stripping with a low-pressure stream to purify water and separate a gas containing ammonia, CO2 and methanol; said gas is then flared or discharged as such. In both cases, however, this technique introduces a further emission into atmosphere. In order to avoid this drawback, the prior art provides an alternative solution of stripping at a medium pressure, namely 25-45 bar, obtaining a gas phase under pressure which is then recycled to the front end. This technique provides internal recycle of the ammonia, $CO_2$ and methanol contained in the process condensate but is expensive requiring equipment under pressure.

U.S. Pat. No. 5,385,646 discloses a method of treating a chemical production plant process effluent aqueous stream of dilute contaminants which requires a stripping section and a rectification section, for example arranged in a tower, which is however expensive.

SUMMARY OF THE INVENTION

The aim of the invention is to provide a novel technique for treatment of process condensate of ammonia plants, overcoming the above disadvantages of the prior art.

This aim is reached with a method for treatment of process condensate in an ammonia plant, wherein:

the ammonia plant comprises a front-end section producing a make-up gas from reforming of a hydrocarbon source, and a synthesis section where the make-up gas is reacted to ammonia;
said process condensate is collected from one or more equipment of the ammonia plant and is an aqueous solution comprising ammonia, carbon dioxide and methanol,
the method being characterized by:
stripping of said process condensate in a stripping environment with low-pressure steam having a pressure of no more than 10 bar, obtaining a vapour phase comprising ammonia, carbon dioxide and methanol stripped from the process condensate;
condensing said vapour phase, obtaining a condensate solution enriched of ammonia and methanol;
re-introducing a first portion of said solution to said stripping environment as reflux;
recycling a second portion of said solution to said ammonia plant.

The pressure of the stripping steam is preferably 5 bar or less, more preferably 3 to 4 bar.

Preferably said first portion of solution is reintroduced directly into the stripping environment. More specifically said first portion of solution is reintroduced into the stripping environment without a previous step of rectification, which is not required by the present invention.

The solution obtained after condensation is enriched of ammonia and methanol compared to the incoming process condensate.

A portion of said solution is recycled to the ammonia plant. Preferably said portion of the solution is recycled to the front-end section and added to the process stream, i.e. to the stream subjected to reforming. To this purpose, said portion of solution is pumped to a suitable pressure, which is usually in the range 25-45 bar (front-end pressure).

Preferably, said second portion of solution is no more than 4% of the condensate solution, more preferably no more than 3% and even more preferably no more than 2%.

In some embodiments the first portion of the above solution is 96 to 98% and the second portion is 2% to 4% of the condensate solution. In a preferred embodiment said second portion is 2% to 3%, more preferably 2% or about 2%.

The above percentages are given by volume. Accordingly, the second portion of solution contains a small fraction of the overhead vapours delivered by the stripping process. Said second portion can also be termed distillate.

An advantage of said distillate containing a small amount of the overall vapour from stripping, for example 2% or about 2%, is to reduce the drawback of contamination of the process stream of the ammonia plant due to the composition of the distillate. For example recycling a too large quantity of overhead vapours to the stripping section, may lead to formation of undesired compounds such as ammonium carbamate, due to the presence of water, carbon dioxide and ammonia in the distillate, whilst a too large second portion of solution recycled to the ammonia plant would impact negatively the ammonia plant front-end, due to the very high water content.

In a preferred embodiment, the front-end comprises a primary reformer and said portion of solution is injected into the process side of the reformer. Accordingly, the ammonia, methanol and carbon dioxide are internally recycled and newly steam reformed with production of hydrogen and carbon oxides, which can be recycled, and carbon dioxide can be further separated in the CO2 separation section.

The stripping of the process condensate is carried out for example in a stripping column. Vapours stripped from the column are condensed and sent to a condensate reflux separator; the liquid phase drawn from the separator is the above mentioned solution.

Preferably, said solution contains $CO_2$ in the range 5 to 10%, methanol in the range 3 to 8% and $NH_3$ in the range 7 to 13%. The concentration of said solution is intended to be a molar concentration [mol %]. The applicant has found that a concentration in this range is preferable to avoid formation of solid crystals and on the other hand to reduce cooling of the process stream after injection which would be caused by excessive dilution.

The considerable advantage of the invention is that the treatment is carried out at a low pressure, thus requiring inexpensive equipment. In addition, thanks to the step of condensation, the recycle stream to the ammonia plant is liquid, so that recycling to the ammonia plant is easier and requires less energy compared to recycling of a gaseous stream. A further advantage is that emissions into atmosphere (particularly of $CO_2$, $NH_3$ and methanol) are avoided.

Another advantage is the ability to increase the capacity of the ammonia plant, in terms of quantity of ammonia produced. The increase is around 0.5% which is small but still interesting from an economic point of view, being obtainable with a low investment cost.

Further aspects of the invention are a plant adapted to carry out the method of the invention, and a method of revamping according to the claims.

A plant according to the invention is characterized by a section for treatment of the process condensate comprising at least a stripper, a condenser and a pumping section. The stripper is fed with the process condensate and with low-pressure steam as a stripping medium, said steam having preferably a pressure of no more than 10 bar; the condenser receives a vapour phase comprising ammonia, carbon dioxide and methanol from said stripper and produces a solution enriched of ammonia and methanol; the pumping section is arranged to re-introduce a first portion of said solution to said stripper and to recycle a second portion of said solution to said ammonia plant.

A revamping according to the invention is characterized by the provision of a section for treatment of the process condensate including at least the above mentioned equipment, namely stripper using low-pressure steam as a stripping medium; condenser and pumping section to re-introduce a first portion of solution to the stripper and to recycle a second portion of said solution to the ammonia plant.

The invention is attractive for revamping an existing plant because it requires the installation of relatively low-cost equipment such as low-pressure stripping column and distillate pumps, while it increases the production of ammonia and eliminates a point of emission.

The method of the invention is now elucidated in a greater detail and with reference to a preferred embodiment according to the scheme of FIG. 1.

DETAILED DESCRIPTION

FIG. 1 shows a process condensate treatment section of an ammonia plant.

Stream 1 denotes a process condensate which is basically an aqueous solution containing ammonia, methanol and carbon dioxide, in a concentration typically of some thousands of ppm, and possibly traces of other contaminants such as alcohols and other hydrocarbons.

Said process condensate 1 after pre-heating in a heat exchanger 2 is sent to a stripping column 3 where it is contacted with a low-pressure stripping steam 4. Said steam 4 is preferably at a pressure of 3 to 5 bar. The stripping column 3 receives pre-heated process condensate 6 and a recirculated solution 7 which will be described later.

The overhead vapour 5 emerging from the stripping column 3 contains water, ammonia, methanol and carbon dioxide stripped from the condensate 1. This vapour 5 is condensed in a condenser 8, for example discharging the condensation heat to water or steam, and the condensate 9 is sent to a separator 10.

The liquid phase 11 drawn from said separator 10 is an ammonia-rich and methanol-rich solution which is split into a first portion 12 and a second portion 13.

The first portion 12 is sent back to the stripping column 3 via a first pump 14 which delivers the recirculated stream 7; the second portion 13 is recycled to the ammonia plant via a second pump 15.

The first portion 12 is sent directly to the stripping column 3 via said pump 14. The second portion 13 for example contains 2% or about 2% of the overhead vapour 5.

Preferably said second portion 13 of the solution is recycled to a primary reformer where it is injected into the process side of the reformer, i.e. mixed with the reforming gas. To this purpose, the second pump 15 delivers a liquid stream 16 at the pressure of primary reforming, for example in the range 25 to 45 bar. This stream 16 can also be termed distilled stream.

The liquid 17 from bottom of the stripping column 3, which is purified water, is partly recirculated into the column 3 after passing through a reboiler 18. Re-heated liquid 19 is introduced back into the lower part of the stripping column 3. Preferably, as shown, the reboiler 18 is heated by low-pressure stripping steam 4. Said low-pressure stripping steam 4 can also be directly fed to the stripping column 3. The remaining portion 20 is preferably cooled in the process condensate pre-heater 2 and the cooled purified water 21 is discharged or exported.

The gas phase 22 from the separator 10 can be used e.g. as a fuel gas.

In a plant having a capacity of 1200 MTD, wherein the process condensate 1 contains about 1000 ppm of ammonia and 1000 ppm of methanol, the recycle of stream 16 allows producing additional 4-5 MTD of ammonia.

It must be noted that the invention can be used to revamp an existing plant for the synthesis of ammonia. A revamping according to the invention requires the addition of the items of FIG. 1, plus auxiliaries such as piping, valves, etc. which in any case are not expensive. Hence the plant can be revamped at an affordable cost. In some cases, a pre-existing treatment section based on stripping and discharge into atmosphere or combustion of the stripped gas can be modified to set-up a section arrangement similar to the one indicated in FIG. 1, thus eliminating a polluting emission.

The invention claimed is:
1. A method for treatment of process condensate in an ammonia plant, wherein:
the ammonia plant comprises a front-end section producing a make-up gas from reforming of a hydrocarbon source, and a synthesis section where the make-up gas is reacted to ammonia;
said process condensate is collected from one or more equipment of the ammonia plant and is an aqueous solution comprising ammonia, carbon dioxide and methanol, the method comprising:

stripping of said process condensate in a stripping environment with low-pressure steam having a pressure of no more than 10 bar, obtaining a vapour phase comprising ammonia, carbon dioxide and methanol stripped from the process condensate;

condensing said vapour phase, obtaining a condensate solution enriched of ammonia and methanol;

re-introducing a first portion of said condensate solution to said stripping environment wherein said first portion of solution is reintroduced directly into said stripping environment;

recycling a second portion of said condensate solution to said ammonia plant, wherein said second portion is no more than 4% by volume of said condensate solution.

2. The method according to claim 1, wherein the pressure of said stripping steam is 5 bar or less.

3. The method according to claim 1, wherein said second portion of solution is recycled to the front-end section of the ammonia plant.

4. The method according to claim 3, wherein said second portion of solution is recycled to a primary reformer of the front-end section of the ammonia plant, where said solution is added to the process stream subjected to reforming.

5. The method according to claim 1, wherein said condensate solution contains 5 to 10 mol % of carbon dioxide, 3 to 8 mol % of methanol and 7 to 13 mol % of ammonia.

6. The method according to claim 1, wherein said second portion is no more than 3% by volume of said condensate solution.

7. The method according to claim 1, wherein said second portion is 2% by volume of said condensate solution.

8. The method according to claim 2, wherein the pressure of said stripping steam is 3 to 5 bar.

9. The method according to claim 1, wherein said second portion is no more than 2% by volume of said condensate solution.

* * * * *